United States Patent Office 3,658,916
Patented Apr. 25, 1972

3,658,916
5,10-SECO-19-NORANDROSTENES
William McCrae, Los Altos, John H. Fried, Palo Alto, and John A. Edwards, Los Altos, Calif., assignors to Syntex Corporation, Panama, Panama
No Drawing. Filed Mar. 18, 1968, Ser. No. 714,078
Int. Cl. C07c 43/18
U.S. Cl. 260—611 F    5 Claims

ABSTRACT OF THE DISCLOSURE

New 5,10-seco-19-norandrostenes prepared from estra-1,3,5(10),6,8-pentaenes having estrogenic activity.

This invention relates to novel 5,10-seco-19-nor-steroids of the androstane series. More particularly, this invention relates to novel steroids of the following formula:

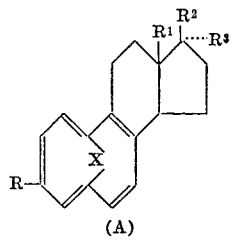

(A)

wherein,

X is methylene, dichloromethylene, difluoromethylene or oxa;

R is hydrogen, carboxylic acyloxy, lower alkoxy, cyclopentyloxy, cyclohexyloxy, tetrahydropyran-2'-yloxy or tetrahydrofuran-2'-yloxy;

$R^1$ is methyl or ethyl;

$R^2$ is hydroxy and the hydrolyzable carboxylic esters thereof, tetrahydropyran-2'-yloxy or tetrahydrofuran-2'-yloxy;

$R^3$ is hydrogen, lower alkyl, lower alkenyl, lower alkynyl, lower haloalkynyl, cyclopropyl, dichlorocyclopropyl, difluorocyclopropyl, propadienyl, dichlorocyclopropenyl or difluorocyclopropenyl; and $R^2$ and $R^3$ taken together represent oxo.

The term "carboxylic acyloxy," as used herein, refers to carboxylic acyloxy groups conventionally employed in the synthetic hormone art containing from 1 to 12 carbon atoms. Typical conventional esters thus included within the scope of the term and the instant invention are acetate, propionate, butyrate, valerate, caproate, enanthate, trifluoroacetate, benzoate, diphenylacetate, diethylacetate, trimethylacetate, and the like.

The term "lower alkyl" refers to straight and branched saturated aliphatic groups containing from one to about six carbon atoms such as methyl, ethyl, isopropyl, and the like. The term "lower alkoxy" refers to straight and branched chain alkoxy groups containing from one to about six carbon atoms such as methoxy, ethoxy, propionoxy, and the like. The term "lower alkenyl" refers to monoethylenically unsaturated aliphatic groups containing from two to about six carbon atoms such as vinyl, propenyl, and the like. The term "lower alkynyl" refers to acetylenic unsaturated groups containing from two to about six carbon atoms such as ethynyl, propynyl, and the like. The term "lower haloalkynyl" refers to a halogen substituted lower alkynyl such as chloroethynyl, fluoroethynyl, trifluoromethylethynyl, and the like containing from two to about six carbon atoms. The terms "di-chlorocyclopropyl" and "difluorocyclopropyl" refer to the group:

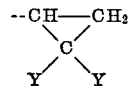

in which Y is chloro or fluoro. The terms "dichlorocyclopropenyl" and "difluorocyclopropenyl" refer to the group:

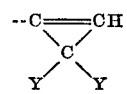

in which Y is chloro or fluoro.

The compounds of the present invention of Formula A possess estrogenic and anti-fertility activity and are useful in the treatment of estrogen deficiencies and in the control and regulation of fertility. By reason of their anti-fertility activity, they are useful for the control of pests, for example, rodents such as rats, mice, nutria, rabbits and the like. For this purpose, the compounds are admixed with a suitable bait such as grain, salmon, and the like, and placed in an area accessible to the rodents. The amount of anti-fertility agent incorporated into the bait is not critical so long as it does not exceed the limit above which the rodent can detect the presence of the agent. The anti-fertility agent/bait mixture is preferably made available to the pest on, for example, alternate days in an amount which, by past experience, can be expected to be entirely consumed in two days.

Edible carriers suitable as a bait include liquids, solids and mixtures thereof such as water, milk, molasses, corn oil, peanut oil, cottonseed oil, sugar, peanut butter, chicken mash, dairy mixes, corn, oats, wheat, bran, meat, fish, lard, chopped grass or hay, cheese, salt, and the like. In addition, conventional pest attractants and other additives normally employed in baits can be added. The compositions of the anti-fertility agent and bait can be prepared, for example, as a granular mix, as a paste, as a syrup, in the form of pellets for ease of application, and the like. Other forms of carriers can also be used such as forming a solution, e.g. a salt solution, or mixture containing a small amount of the anti-fertility agent, and impregnating a suitable carrier such as cellulosic materials, e.g. wood, with the solution.

The novel 5,10-seco steroids of the present invention wherein R is hydrogen, that is, the 3-desoxy-5,10-seco steroids, can be prepared according to the following outlined procedure wherein, for the sake of simplicity and clarity, only Rings A and B of the molecule are shown:

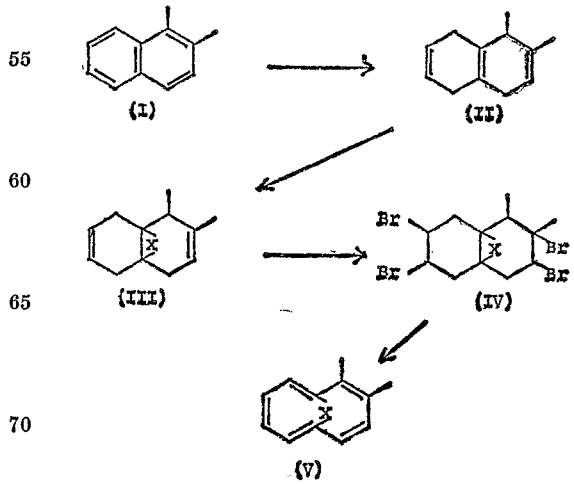

In practicing the process outlined above, a 3-desoxy-estra-1,3,5(10),6,8-pentaene is reduced to the 3-desoxy-estra-2,5(10),7-triene (II) by treatment with an alkali metal such as sodium, potassium or lithium in liquid ammonia in the presence of a lower alcohol such as ethanol, t-butanol, and the like.

A compound of Formula II is then converted into a compound of Formula III wherein X is methylene, dichloromethylene, difluoromethylene or oxa. A compound of Formula III wherein X is oxo can be obtained by treating the estra-2,5(10),7-triene (II) with a peracid such as perpenzoic acid, perphthalic acid, m-chloroperbenzoic acid, and the like, preferably m-chloroperbenzoic acid, in an organic solvent inert to the reaction such as methylene chloride, carbon tetrachloride, hexane, and the like.

A compound of Formula III wherein X is dichloromethylene or difluoromethylene can be obtained by reacting a compound of Formula II with a dihalocarbene generated from sodium trichloroacetate and sodium chlorodifluoroacetate, respectively. This reaction can be carried out in an organic solvent such as diglyme or monoglyme at elevated temperatures such as reflux.

The 5,10-methylene compounds of Formula III (X is methylene) can be prepared by treating a 5,10-dichloromethylene with sodium or lithium in liquid ammonia in the presence of a lower alcohol.

A compound of Formula III is then converted into the tetrabromo derivative (IV) by treatment with bromine in an inert organic solvent such as chloroform, carbon tetrachloride, and the like. The tetrabromo compound (IV) upon treatment with a base such as an alkali metal hydroxide, alkali alkoxide, and the like, e.g. sodium hydroxide, sodium methoxide, potassium t-butoxide or sodium t-butoxide in an organic solvent such as ether, diglyme, dioxane, hexamethylphosphoramide, dimethyl sulfoxide, tetrahydrofuran, and the like, is converted into the 5,10-seco compounds of Formula V.

The compounds of the present invention of Formula A wherein R is other than hydrogen can be prepared according to the following outlined procedure:

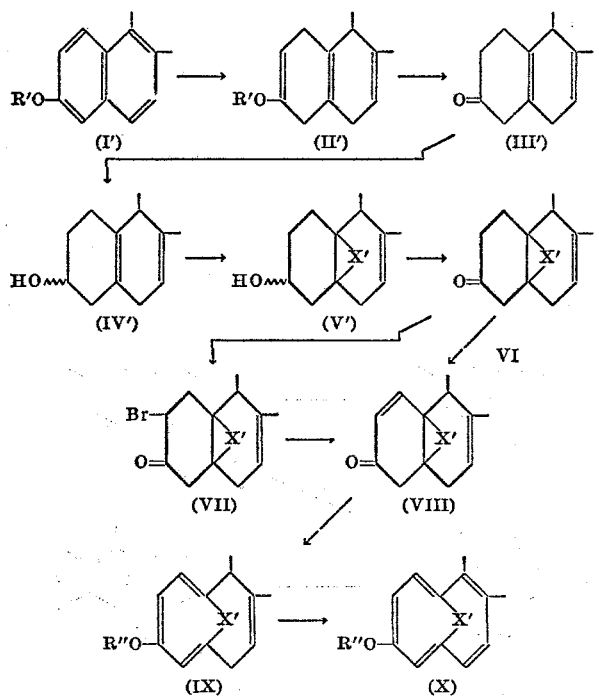

In the above formulas, R' is lower alkyl, R'' is lower alkyl, cyclopentyl, cyclohexyl, a carboxylic acyl group, tetrahydropyran-2'-yl or tetrahydrofuran-2'-yl and X' is methylene, dichloromethylene or difluoromethylene.

In the practice of the above outlined process, an estra-1,3,5(10),6,8-pentaene (I') is reduced using an alkali metal and liquid ammonia to afford the 3-alkoxyestra-2,5(10),7-triene (II') which is treated with weak acid such as oxalic acid, dilute acetic acid, or the like to afford the 3-oxoestra-5(10), 7-diene (III'). The 3-oxo steroid is then reduced as by treatment with sodium borohydride, lithium hydride, lithium aluminum t-butoxide, or the like to the 3-hydroxy derivative (IV'). A 3-hydroxyestra-5(10),7-diene of Formula IV' is then converted into a 5,10-methylene, 5,10-dichloromethylene or 5,10-difluoromethylene of Formula V' using the procedure described hereinabove. A 3-hydroxy compound of Formula V' is then oxidized as by treatment with chromium trioxide in pyridine, Jones reagent, or the like to obtain the 3-oxo compound of Formula VI. In this reaction, if a secondary hydroxy group is present at C–17 it is converted into the 17-oxo group during the course of the reaction. A 3-oxoestra-7-ene of Formula VI is then converted into the corresponding 1,2-dehydro derivative (VIII) by treatment with selenium dioxide, 2,3-dichloro-5,6 - dicyano - 1,4 - benzoquinone, or the like. Alternatively, the 3-oxo of Formula VI is treated with cupric bromide to afford the 2-bromo compound (VII) which is then dehydrobrominated by treatment with an alkali halide and alkali metal carbonate or bicarbonate or alkaline earth salt such as lithium bromide and sodium bicarbonate, lithium chloride and sodium carbonate, lithium bromide and calcium carbonate, and the like, to furnish the 3-oxoestra-1,7-diene (VIII). Treatment of a 3-oxo-estra-1,7-diene (VIII) with carboxylic acid anhydride, e.g. acetic anhydride, propionic anhydride, butyric anhydride, benzoic anhydride, trichloroacetic anhydride, in the presence of an acid catalyst such as p-toluenesulfonic acid, and the like, affords 5,10-seco-3-acyloxy steroid of Formula IX (IX, R'' is acyl). Alternatively, a 3-oxoestra-1,7-diene of Formula VIII is reacted with a lower alcohol or cycloalkyl alcohol such as methanol, ethanol, pentanol, cyclopentanol or cyclohexanol in the presence of an acid catalyst such as p-toluenesulfonic acid to afford a 5,10-seco-3-alkyloxy or 5,10-seco-3-cycloalkyloxy of Formula IX. A 5,10-seco steroid (IX) is then treated with palladium catalyst, 2,3 - dichloro - 5,6 - dicyano-1,4-benzoquinone or N-bromosuccinimide to obtain a 5,10-seco-19-norandrosta-1(10),2,4,6,8-pentaene of Formula X.

In the case of a compound of Formula A wherein X is oxa and R is other than hydrogen, the following outlined procedure can be used:

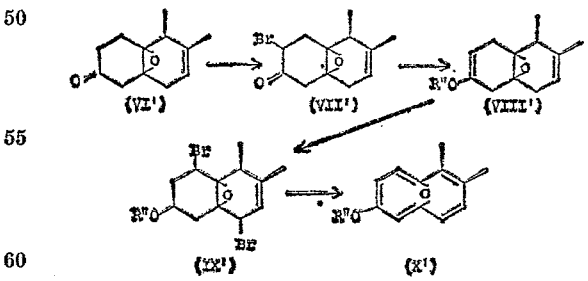

In the above outlined procedure, R'' is the same as defined hereinabove. In the practice of this procedure, the 3-keto compound of Formula VI' is converted into the 2-bromo derivative (VII') by treatment with cupric bromide. A 5,10-oxido compound of Formula VI' is obtained by treating a compound of Formula IV' with a peracid followed by oxidation as by treatment with chromium trioxide in pyridine or the like. A 2-bromo derivative (VII') is treated with zinc at about 50° C. to 60° C. to form the zinc enolate thereof which is then treated with a carboxylic acid anhydride to obtain a 2,7-diene of Formula VIII' wherein R'' is a carboxylic acyl group. To obtain compounds of Formula VIII' wherein R'' is lower alkyl or cycloalkyl, the zinc enolate is treated with the corresponding dialkyl sulfate or dicycloalkyl sulfate. Compounds of Formula VIII' wherein R'' is tetrahydropyranyl or tetrahydrofuranyl are obtained by treating the zinc enolate with tetrahydropyranyl halide or tetrahydrofuranyl halide. A compound of Formula VIII' is then brominated using N-bromosuccinimide or the like to the dibromo derivative (IX') which is dehydrobrominated by treatment with pyridine or other weak base to obtain the 5,10-seco-5,10-oxido (X').

The estra-1,3,5(10),6,8-pentaene starting materials of Formulas I and I' can be obtained by conventional procedures. See for example, Fieser and Fieser, Steroids, Reinhold Publishing Corp., N.Y., 444 (1959) and U.S. Pats. 2,705,239; 2,947,763; 3,020,994 and 3,318,922. The compounds of Formulas II, II', III' and IV' can also be obtained using the procedures of U.S. Pat. 2,930,805. Suitable starting materials include, for example, estra-1,3,5(10),6,8 - pentaen-17β-ol, 3-methoxyestra-1,3,5(10), 6,8 - pentaen - 17β - ol, 3 - methoxy-17α-methylestra-1,3,5(10),6,8 - pentaen - 17β-ol, 3-methoxy-17α-cyclopropylestra - 1,3,5(10),6,8 - pentaen - 17β-ol, 3-methoxy-17α - difluorocyclopropylestra - 1,3,5(10),6,8-pentaen-17β - ol, 3 - methoxy - 18 - methylestra-1,3,5(10),6,8-pentaen-17β-ol, and the like.

The compounds of the present invention wherein $R^3$ is dihalocyclopropenyl or dihalocyclopropyl can be obtained by treating a 17α - ethynyl and 17α-vinyl, respectively, with a dihalocarbene generated from sodium trichloroacetate or sodium chlorodifluoroacetate.

The 17α-alkyl, 17α-alkenyl and 17α-alkynyl compounds of the present invention can be prepared from a 17-oxo compound of Formula A using conventional procedures, see for example, U.S. Pat. 3,257,427. The 17α-cyclopropyl compounds can be obtained by treating a 17-keto compound with a cyclopropylmagnesium halide.

The following examples are provided to illustrate the present invention.

EXAMPLE 1

To a refluxing solution of 1 g. of 3-methoxy-17α-vinyl-18-methylestra-1,3,5(10),8-tetraen-17β-ol in 10 ml. of diglyme is added over a two hour period in a dropwise fashion with stirring, a solution of 35 equivalents of sodium chlorodifluoroacetate in 40 ml. of diglyme. After refluxing for one additional hour, the mixture is filtered. The filtrate is evaporated to dryness and the residue is chromatographed on alumina, eluting with methylene chloride, to yield 3-methoxy-17α-(2',2' - difluorocyclopropyl)-18-methylestra-1,3,5(10),8-tetraen-17β-ol.

In a similar manner, 3-methoxyestra-1,3,5(10),8-tetraen-17-one is converted into 3-methoxy-17α-(2',2'-difluorocyclopropyl)-estra-1,3,5(10,8-tetraen-17β-ol.

A mixture of 1.0 g. of 3-methoxy-17α-(2',2'-difluorocyclopropyl) - 18 - methylestra-1,3,5(10),8-tetraen-17β-ol, 10 mg. of 5% palladium-on-charcoal catalyst and 75 ml. of xylene is heated at reflux for about 24 hours. The mixture is then cooled, filtered to remove catalyst and the filtrate is evaporated under reduced pressure to yield 3-methoxy-17α - (2',2' - difluorocyclopropyl) - 18 - methylestra-1,3,5(10),6,8-pentaen-17β-ol which can be purified by chromatography.

Alternatively, the 6,7-dehydro compound can be obtained using 2,3-dichloro-5,6-dicyano - 1,4 - benzoquinone in dioxane at reflux for about 12 hours.

EXAMPLE 2

A solution of 2 g. of 3-methoxy-18-methylestra-1,3,5-(10),8-tetraen-17-one in 100 ml. of thiophene-free benzene is treated with an equimolar amount of cyclopropylmagnesium bromide in anhydrous ether. The mixture is heated at reflux under anhydrous conditions for three hours, cooled and cautiously treated with excess aqueous ammonium chloride solution. The mixture is extracted with ethyl acetate. The ethyl acetate layer is separated, washed, dried and evaporated to give 3-methoxy-17α-cyclopropyl-18 - methylestra - 1,3,5(10),8-tetraen-17β-ol which is converted into the corresponding 6,7-dehydro by the procedure of Example 1.

EXAMPLE 3

A solution of 10 g. of estra-1,3,5(10),6,8-pentaen-17β-ol in 100 ml. of ethanol:ether (1:1) is added to 15 g. of sodium in 500 ml. of liquid ammonia at −78°. After about one hour, the reaction mixture is allowed to rise to room temperature and then about 200 ml. of water followed by about 400 ml. of ether is added. The ether layer is separated, washed, dried over magnesium sulfate and evaporated to give estra-2,5(10,7-trien-17β-ol which can be purified by recrystallization from methanol.

By repeating the above procedure using as the starting material 3-methoxyestra-1,3,5(10),6,8-pentaen-17β-ol, estra-1,3,5(10),6,8-pentaen-17-one, 3 - methoxy - 18 - methylestra-1,3,5(10),6,8-pentaen - 17α - difluorocyclopropyl-17β-ol and 3 - methoxy - 17α - cyclopropyl - 18 - methylestra-1,3,5(10),6,8-pentaen-17β-ol, there is obtained the corresponding estra-2,5(10),7-trienes, that is, 3-methoxyestra-2,5(10),7-trien-17β-ol, estra - 2,5(10),7-trien-17β-ol, 3-methoxy - 17α - difluorocyclopropyl-18-methylestra-2,5-(10),7-trien-17β-ol and 3-methoxy - 17α - cyclopropyl-18-methylestra-2,5(10),7-trien-17β-ol, respectively.

EXAMPLE 4

To a solution of 5 g. of estra-2,5(10),7-trien-17β-ol in 100 ml. of diglyme heated to about 135°, there is added slowly a solution of 1.5 equivalents of sodium trichloroacetate in 100 ml. of diglyme over a period of about one hour. The reaction mixture is then allowed to cool to about room temperature and is then diluted with water and ethyl acetate. The ethyl acetate layer is separated, washed, dried over magnesium sulfate and evaporated to give 5,10-dichloromethylene-19-norandrosta-2,7-dien - 17β - ol which can be purified by recrystallization from methanol.

By using sodium chlorodifluoroacetate in place of sodium trichloroacetate in the above procedure, there is obtained 5,10-difluoromethylene-19-norandrosta - 2,7 - dien-17β-ol.

EXAMPLE 5

A solution of 1 g. of 5,10-dichloromethylene-19-norandrosta-2,7-dien-17β-ol in dry tetrahydrofuran is refluxed for about 48 hours with a molar excess of lithium aluminum hydride. The reaction mixture is diluted with water and ethyl acetate. The ethyl acetate layer is separated, washed dried and evaporated to give 5,10-methylene-19-norandrosta-2,7-dien-17β-ol.

EXAMPLE 6

To a solution of 1 g. of 5,10-methylene-19-norandrosta-2,7-dien-17β-ol in 100 ml. of carbon tetrachloride containing a trace of pyridine, there is added 2 equivalents of bromine in 50 ml. of carbon tetrachloride. The reaction mixture is allowed to stand at room temperature for 20 hours. The reaction mixture is washed, dried and evaporated to give 2,3,7,8-tetrabromo-5,10-methylene - 19 - norandrostan-17β-ol.

One gram of the thus-obtained tetrabromo derivative is dissolved in 15 ml. of dry tetrahydrofuran and then about 2 g. of potassium- t-butoxide is added. The reaction mixture is allowed to stand for about three hours and then it is diluted with water and ether. The ether layer is separated, washed, dried and evaporated to give 5,10-seco-5,10-methylene - 19 - norandrosta - 1(10),2,4,6,8-pentaen-17β-ol.

By repeating the process of this example using 5,10-dichloromethylene-19-norandrosta-2,7-dien - 17β - ol and 5,10-difluoromethylene - 19 - norandrosta - 2,7 - dien-17β-ol as the starting material, there is obtained 5,10-seco-5,10 - dichloromethylene - 19 - norandrosta-1(10),2,4,6,8-pentaen-17β-ol and 5,10-seco-5,10-difluoromethylene-19-norandrosta-1(10),2,4,6,8-pentaen-17β-ol, respectively.

EXAMPLE 7

A solution of 20 g. of meta-chloroperbenzoic acid (75%) in 300 ml. of ethyelne chloride is added slowly to 1 equivalent of estra-2,5(10),7-triene-17β-ol in about 400 ml. of methylene chloride at −78° over a period of about one hour. After addition is complete, the reaction mixture is allowed to warm to room temperature. The reaction mixture is then washed with aqueous sodium sulfite, water, and then aqueous sodium carbonate which is then dried over magnesium sulfate and evaporated to give 5,10-oxido-19-norandrosta-2,7-dien-17β-ol which can be purified by recrystallization from hexane.

EXAMPLE 8

To a solution of 5 g. of 5,10-oxido-19-norandrosta-2,7-dien-17β-ol in 100 ml. of chloroform, there is added dropwise 2 equivalents of bromine in 100 ml. of chloroform at a temperature of about 15–20°. The reaction mixture is allowed to stand at room temperature for about 16 hours and is then washed with sodium sulfite solution and evaporated to give 2,3,7,8-tetrabromo-5,10-oxido-19-norandrostan-17β-ol.

The above 2,3,7,8-tetrabromo derivative is treated with potassium t-butoxide as described in Example 6 to give 5,10 - seco - 5,10-oxido-19-norandrosta-1(10),2,4,6,8-pentaen-17β-ol.

EXAMPLE 9

A solution of 0.75 g. of 5,10-dichloromethylene-19-norandrosta-2,7-dien-17β-ol in 50 ml. of ether is added to a solution of 175 mg. of sodium in 150 ml. of liquid ammonia with stirring. After two hours, ammonium chloride is added until the blue color is discharged and the ammonia allowed to evaporate. Extraction with ether and recrystallization from methanol affords 5,10-methylene-19-norandrosta-2,7-dien-17β-ol.

EXAMPLE 10

A solution of 1 g. of estra-1,3,5(10),6,8-pentaen-17β-ol in 50 ml. of t-butyl alcohol:tetrahydrofuran (1:1) is added to 10 g. of lithium in 50 ml. of liquid ammonia. The mixture is allowed to stand for about four hours and the ammonia then allowed to separate. The residue is extracted with ether and these extracts are evaporated. The resulting residue is chromatographed on alumina with benzene:ether to give estra-2,5(10),7-trien-17β-ol which can be further purified by recrystallization from acetone:hexane.

By use of the above procedure, 3-methoxyestra-1,3,5(10),6,8 - pentaen-17β-ol, estra-1,3,5(10),6,8,-pentaen-17-one and 3-methoxy-18-methylestra-1,3,5(10),6,8-pentaen-17β-ol are converted into 3-methoxyestra-2,5(10),7-trien-17β-ol, estra-2,5(10),7-trien-17β-ol and 3-methoxy-18-methylestra-2,5(10),7-trien-17β-ol, respectively.

EXAMPLE 11

A mixture of 2 g. of 3-methoxyestra-2,5(10),7-trien-17β-ol and 35 ml. of methanol is heated to reflux and 3.5 ml. of acetic acid added. This mixture is refluxed for about 15 minutes and then allowed to cool. The mixture is then diluted with water and filtered. The crude product is crystallized from methanol and then from a mixture of acetone and petroleum ether to give 17β-hydroxyestra-5(10),7-dien-3-one.

EXAMPLE 12

To a mixture of 2 g. of 17β-hydroxyestra-5(10),7-dien-3-one and 30 ml. of methanol, there is added a mixture of 1 equivalent of sodium borohydride in 25 ml. of methanol. The reaction mixture is allowed to stand at room temperature for about three hours and then filtered. The filtrate is acidified to about pH 6 with weak aqueous acetic acid and then diluted with water and filtered. The crude product is crystallized from aqueous methanol and then from benzene:hexane to give estra-5(10),7-diene-3,17β-diol which is used as the starting material in the procedure of Example 4 to yield 5,10-dichloromethylene-19-norandrost-7-ene-3,17β-diol.

A solution of 6 g. of 5,10-dichloromethylene-19-norandrost-7-ene-3,17β-diol in 120 ml. of pyridine is added to a mixture of 6 g. of chromium trioxide in 20 ml. of pyridine. The reaction mixture is allowed to stand at room temperature for 15 hours, diluted with ethyl acetate and filtered through Celite diatomaceous earth. The filtrate is washed well with water, dried and evaporated to dryness to yield 5,10-dichloromethylene-19-norandrost-7-ene-3,17-dione which may be further purified by recrystallization from acetone:hexane.

EXAMPLE 13

A mixture of 0.5 g. of 5,10-dichloromethylene-19-norandrost-7-ene-3,17-dione, 10 ml. of dioxane and 0.35 g. of 2,3-dichloro-5,6-dicyano-1,4-benzoquinone is refluxed for 10 hours. The mixture is then cooled, filtered and evaporated to dryness. The residue is dissolved in acetone and this solution is then filtered through 10 g. of alumina and concentrated to yield 5,10-dichloromethylene-19-norandrosta-1,7-diene-3,17-dione which is further purified by recrystallization from acetone:hexane.

EXAMPLE 14

A mixture of 1 g. of 5,10-dichloromethylene-19-norandrosta-1,7-diene-3,17-dione, 20 ml. of acetic anhydride and 100 mg. of p-toluenesulfonic acid is refluxed for one hour. The reaction mixture is then poured into sodium carbonate solution to hydrolyze any excess anhydride. This mixture is extracted with methylene chloride. The methylene chloride extracts are washed, dried and evaporated to give 3 - acetoxy - 5,10 - seco - 5,10 - dichloromethyleneestra-1(10),2,4,7-tetraen-17-one.

A mixture of 0.5 g. of the above compound, 10 ml. of dioxane and 0.35 g. of 2,3-dichloro-5,6-dicyano-1,4-benzoquinone is refluxed for 10 hours. The mixture is then cooled, filtered and evaporated to dryness. The residue is dissolved in acetone and this solution is then filtered through 10 g. of alumina and concentrated to yield 3 - acetoxy - 5,10 - seco - 5,10 - dichloromethyleneestra-1(10),2,4,6,8-pentaen-17-one which is further purified by recrystallization from acetone:hexane.

EXAMPLE 15

A mixture of 3 g. of 5,10-dichloromethylene-19-norandrosta-1,7-diene-3,17-dione, 250 ml. of methanol and 300 mg. of p-toluenesulfonic acid is refluxed for about 30 minutes. The mixture is cooled, diluted with water and extracted with ether. The combined ether extracts are washed with sodium bicarbonate solution and water, dried and evaporated. The residue is crystallized from methanol to give 3-methoxy-5,10-seco-5,10-dichloromethylene-19-norandrosta-1(10),2,4,7-tetraen-17-one which is treated according to the procedure of the second paragraph of Example 14 to give the corresponding 3-methoxy-5,10-seco - 5,10-dichloromethylene-19-norandrosta-1(10),2,4,6,8-pentaen-17-one.

EXAMPLE 16

A mixture of 1.7 g. of 17β-hydroxy-5,10-dichloromethylene-19-norandrost-7-en-3-one, 2.3 g. of cupric bromide and 200 ml. of methanol is refluxed for 24 hours. The reaction mixture is poured into water and the resulting mixture extracted with chloroform. The organic extracts are dried over magnesium sulfate and evaporated. The residue is chromatographed on silica gel eluting with ether:benzene to give 2-bromo-17β-hydroxy-5,10-dichloromethylene-19-norandrost-7-en-3-one which can be further purified by recrystallization from methanol.

A mixture of 1 g. of the above 2-bromo compound, 1.2 g. of lithium carbonate, 1.2 g. of lithium bromide and 100 ml. of dimethylformamide is stirred at about 90° for 20 hours. The reaction mixture is poured into weakly acidic water and extracted with ether. The ether extracts are washed well with water, dried and evaporated. The residue is chromatographed on alumina eluting with benzene:hexane to yield 17β-hydroxy-5,10-dichloromethylene-19-norandrosta-1,7-dien-3-one.

EXAMPLE 17

A solution of 20 g. of metachloroperbenzoic acid (75%) in 300 ml. of methylene chloride is added slowly to 1 equivalent of estra-5(10),7-diene-3,17β-diol in about 400 ml. of methylene chloride at −78° over a period of about one hour. After addition is complete, the reaction mixture is allowed to warm to room temperature. The reaction mixture is then washed with aqueous sodium sulfite, water and then aqueous sodium carbonate which is then dried over magnesium sulfate and evaporated to give 5,10-oxido-19-norandrost-7-ene-3,17-diol which can be purified by recrystallization from hexane or chromatography. This compound is treated with chromium trioxide in pyridine using the procedure of Example 12 to give 5,10-oxido-19-norandrost-7-ene-3,17-dione.

EXAMPLE 18

By reacting 5,10-oxido-19-norandrost-7-ene-3,17-dione with cupric bromide according to the procedure of Example 16, there is obtained 2-bromo-5,10-oxido-19-norandrost-7-ene-3,17-dione.

EXAMPLE 19

A mixture of 3 g. of 2-bromo-5,10-oxido-19-norandrost-7-ene-3,17-dione, about 2 equivalents of zinc powder and 200 ml. of dry tetrahydrofuran is stirred for about two hours at 50–60°. Stirring is continued until formation of zinc enolate is complete as followed by thin layer chromatography. The mixture is allowed to stand and cool and then decanted under anhydrous conditions. To the thus-obtained solution there is added about 50 ml. of acetic anhydride and the mixture stirred. The reaction mixture is then allowed to stand at room temperature until formation of the enol acetate is complete as followed by thin layer chromatography. The reaction mixture is then diluted with pyridine and poured into water. This mixture is extracted with methylene chloride. The methylene chloride extracts are washed, dried and evaporated to give 3-acetoxy-5,10-oxido-19-norandrosta-2,7-dien-17-one.

By using other carboxylic acid anhydrides, e.g. propionic anhydride, butyric anhydride, trifluoroacetic anhydride, benzoic anhydride, and the like, in place of acetic anhydride in the above procedure, the corresponding 3-acyloxy derivatives are obtained.

By repeating the above procedure with the exception of using an equivalent amount of dimethyl sulfate, dicyclopentyl sulfate, tetrahydropyranyl chloride and tetrahydrofuranyl chloride in place of acetic anhydride, the corresponding enol ethers are obtained, that is, 3-methoxy-5,10-oxido-19-norandrosta-2,7-dien-17-one, 3-cyclopentyloxy-5,10-oxido-19-norandrosta-2,7-dien-17-one, 3-(tetrahydropyran-2′-yloxy)-5,10-oxido-19-norandrosta-2,7-dien-17-one and 3-(tetrahydrofuran-2′-yloxy)-5,10-oxido-19-norandrosta-2,7-dien-17-one, respectively.

Similarly, by repeating this example using 2-bromo-5,10-methylene-19-norandrost-7-ene-3,17-dione as the starting material in place of 5,10-oxido-19-norandrost-7-ene-3,17-dione, the corresponding enol acylates and enol ethers are obtained, e.g. 3-acetoxy-5,10-methylene-19-norandrosta-2,7-dien-17-one, 3-methoxy-5,10-methylene-19-norandrosta-2,7-dien-17-one, 3-cyclopentyloxy-5,10-methylene-19-norandrosta-2,7-dien-17-one, 3-(tetrahydropyran-2′-yloxy)-5,10-methylene-19-norandrosta-2,7-dien-17-one and 3-(tetrahydrofuran-2′-yloxy)-5,10-methylene-19-norandrosta-2,7-dien-17-one.

EXAMPLE 20

A mixture of 2 g. of 3-methoxy-5,10-oxido-19-norandrosta-2,7-dien-17-one and 2 equivalents of N-bromosuccinimide in 50 ml. of carbon tetrachloride is refluxed for about one hour. The mixture is then filtered and evaporated to dryness under reduced pressure to yield 3-methoxy-5,10-oxido-1,6-dibromo-19-norandrosta-2,7-dien-17-one which can be purified by recrystallization from methylene chloride:hexane or chromatography.

One gram of the thus-obtained dibromo derivative, 10 ml. of dry pyridine and 20 ml. of dry tetrahydrofuran is refluxed under nitrogen for about three hours. The reaction mixture is then diluted with water and ether. The organic layer is separated, washed, dried and evaporated under reduced pressure to give 3-methoxy-5,10-seco-5,10-oxido-19-norandrosta-1(10),2,4,6,8-pentaen-17-one which can be further purified by chromatography.

The procedure of this example is repeated using 3-acetoxy-5,10-oxido-19-norandrosta-2,7-dien-17-one as the starting material and there is obtained 3-acetoxy-5,10-seco-5,10-oxido-19-norandrosta-1(10),2,4,6,8-pentaen-17-one.

Similarly, by using the other 19-norandrosta-2,7-dienes of Example 19 in the above procedure, the corresponding 5,10-seco-19-norandrosta-1(10),2,4,6,8-pentaenes are obtained.

EXAMPLE 21

A solution of 1 g. of 3-methoxy-5,10-seco-5,10-oxido-19-norandrosta-1(10),2,4,6,8-pentaen-17-one in 50 ml. of tetrahydrofuran is added over a 30 minute period to a stirred suspension of 1 g. of lithium aluminum hydride in 50 ml. of anhydrous tetrahydrofuran and this mixture is heated at reflux for two hours. To the mixture are cautiously added 5 ml. of ethyl acetate and 2 ml. of water. Sodium sulfate is next added, the mixture is filtered and the solid thus collected is washed with hot ethyl acetate. The combined organic solutions are then evaporated to yield 3-methoxy-5,10-seco-5,10-oxido-19-norandrosta-1(10),2,4,6,8-pentaen-17β-ol which can be further purified by recrystallization from acetone:hexane.

By use of the above procedure, other 17-keto compounds can be converted into the corresponding 17β-hydroxy derivative.

EXAMPLE 22

Two milliliters of dihydropyran are added to a solution of 1 g. of 3-methoxy-5,10-seco-5,10-oxido-19-norandrosta-1(10),2,4,6,8-pentaen-17β-ol in 15 ml. of benzene. About 1 ml. is removed by distillation to remove moisture and 0.4 g. of p-toluenesulfonic acid is added to the cooled solution. This mixture is allowed to stand at room temperature for four days and is then washed with aqueous sodium carbonate solution and water, dried and evaporated. The residue is chromatographed on neutral alumina, eluting with hexane, to yield 17β-(tetrahydropyran-2′-yloxy)-3-methoxy-5,10-seco-5,10-oxido-19-norandrosta-1(10),2,4,6,8-pentaene which is recrystallized from pentane.

By using dihydrofuran in place of dihydropyran in the foregoing process, there is obtained 17β-(tetrahydrofuran-2′-yloxy)-3-methoxy-5,10-seco-5,10-oxido-19-norandrosta-1(10),2,4,6,8-pentaene.

By use of the above procedure, other 3-hydroxy and 17-hydroxy compounds can be converted into the corresponding tetrahydropyranyl ethers, tetrahydrofuranyl ethers and bis ethers.

EXAMPLE 23

A solution of 6 g. of 5,10-seco-5,10-methylene-19-norandrosta-1(10),2,4,6,8-pentaen-17β-ol in 120 ml. of pyridine is added to a mixture of 6 g. of chromium trioxide in 20 ml. of pyridine. The reaction mixture is allowed to stand at room temperature for 15 hours, diluted with ethyl acetate and filtered through Celite diatomaceous earth. The filtrate is washed well with water, dried and evaporated to dryness to yield 5,10-seco-5,10-methylene-19-norandrosta-1(10),2,4,6,8-pentaen-17-one which can be further purified by recrystallization from acetone: hexane.

By repeating the above procedure using 5,10-seco-5,10-oxido-19-norandrosta-1(10),2,4,6,8-pentaen-17β-ol, 3-methoxy - 5,10 - seco - 5,10-dichloromethylene-19-norandrosta-1,(10),2,4,6,8-pentaen-17β-ol, 5,10-seco-5,10-difluoromethylene-19-norandrosta - 1(10),2,4,6,8 - pentaen-17β-ol and 3-acetoxy-5,10-seco-5,10-dichloromethylene-19 - norandrost - 1(10),2,4,6,8 - pentaen-17β-ol as the starting material, the corresponding 17-oxo compounds are obtained.

EXAMPLE 24

A solution of 5 g. of 5,10-seco-5,10-methylene-19-norandrosta-1(10),2,4,6,8-pentaen-17-one in 250 ml. of thiophene-free benzene is treated with an equimolar amount of methylmagnesiumbromide in anhydrous ether. The mixture is heated at reflux under anhydrous conditions for three hours, cooled, and cautiously treated with excess ammonium chloride solution. This mixture is then extracted with ethyl acetate and these extracts are in turn washed with water, dried over sodium sulfate and evaporated to dryness to yield 17α-methyl-5,10-seco-5,10-methylene-19-norandrosta-1(10),2,4,6,8-pentaen-17β-ol which is recrystallized from methylene chloride:hexane.

By using the thus-obtained 17β-hydroxy compound as the starting material in the process of Example 22, the corresponding 17β-tetrahydropyran-2-yl ether and 17β-tetrahydrofuran-2-yl ether are obtained.

EXAMPLE 25

To a stirred solution of 2 g. of 5,10-seco-5,10-methylene - 19 - norandrosta-1(10),2,4,6,8-pentaen - 17 - one in 250 ml. of absolute ether is added in a dropwise fashion and under nitrogen, an ethereal solution of 10 molar equivalents of ethyl lithium. The mixture is then stirred for 48 hours at room temperature, poured into water, acidified with hydrochloric acid and stirred vigorously for one hour. The ethereal phase is separated, washed with water to neutrality, dried over sodium sulfate and evaporated to dryness to yield 17α-ethyl-5,10-seco-5,10-methylene - 19 - norandrosta-1(10),2,4,6,8-pentaen-17β-ol which is further purified through recrystallization from acetone:hexane.

EXAMPLE 26

A solution of 1 g. of 5,10-seco-5,10-methylene-19-norandrosta-1(10),2,4,6,8-pentaen-17-one in 30 ml. of anhydrous benzene is added under nitrogen to a solution of 1.4 g. of potassium in 30 ml. of t-amyl alcohol previously saturated with acetylene. A slow current of purified acetylene is continually passed through the solution for 40 hours. The mixture is diluted with water and extracted with benzene. These extracts are washed with water to neutrality, dried over sodium sulfate and evaporated. Chromatography of the residue on alkaline alumina with 2:3 hexane:benzene yield 17α-ethynyl-5,10-seco-5,10-methylene-10-norandrosta - 1(10),2,4,6,8-pentaen-17β-ol which is recrystallized from acetone:hexane.

By using methylacetylene in place of acetylene in the above process, there is obtained 17α-(prop-1'-ynyl)-5,10-seco - 5,10 - methylene - 19 - norandrosta-1(10),2,4,6,8-pentaen-17β-ol.

EXAMPLE 27

A solution of 5 g. of 5,10-seco-5,10-methylene-19-norandrosta-1(10),2,4,6,8-pentaen-17-one in 250 ml. of thiophene-free benzene is treated with 10 molar equivalents of vinylmagnesium bromide in anhydrous ether. The mixture is heated at reflux under anhydrous conditions for 24 hours, cooled, and cautiously treated with excess aqueous ammonium chloride solution. The resulting mixture is then extracted with ethyl acetate, the extracts washed with water, dried over sodium sulfate, and evaporated to dryness furnishing 17α-vinyl-5,10-seco-5,10-methylene-19-norandrosta - 1(10),2,4,6,8- - pentaen-17β-ol which can be further purified by recrystallization from methylene chloride:hexane.

By using other 17-keto compounds of the present invention in the above procedure, the corresponding 17α-vinyl-17β-ol derivatives are obtained.

EXAMPLE 28

A solution of 8.5 g. of 1,2-dichloroethylene in 50 ml. of anhydrous ether is added in a dropwise fashion, under nitrogen and at 0° C., over a 30 minute period to a stirred solution of 15 ml. of 1.4 N methyl lithium in anhydrous ether. After stirring for an additional 90 minutes at room temperature, a solution of 0.5 g. of 3-methoxy - 5,10 - seco - 5,10-methylene-19-norandrosta-1(10),2,4,6,8 - pentaen - 17 - one in 20 ml. of anhydrous ether is added in a dropwise fashion with stirring over a 15 minute period. Stirring at room temperature is continued for 18 hours, and the reaction mixture is then poured into ice water and extracted with ether. These extracts are washed with water, dried over sodium sulfate and concentrated under reduced pressure. The residue is chromatographed on alkaline alumina with 8:2 hexane: ether to yield 3-methoxy-5,10-seco-5,10-methylene-17α-chloroethynyl - 19 - norandrosta-1(10),2,4,6,8-pentaen - 17β - ol which may be recrystallized from methanol.

By repeating the above using other 17-keto compounds of the present invention as the starting material, the corresponding 17α-chloroethynyl-17β-hydroxy derivatives are obtained.

EXAMPLE 29

To refluxing solution of 1 g. of 3-methoxy-5,10-seco-5,10 - methylene - 17α - vinyl - 19 - norandrosta-1(10),2,4,6,8-pentaen-17β-ol in 10 ml. of diglyme is added over a two hour period in a dropwise fashion with stirring, a solution of 35 equivalents of sodium trichloroacetate in 40 ml. of diglyme. After refluxing for one additional hour, the mixture is filtered. The filtrate is evaporated to dryness and the residue is chromatographed on alumina, eluting with methylene chloride, to yield 17α-(2',2'-dichlorocyclopropyl) - 3 - methoxy - 5,10 - seco - 5,10-methylene-19-norandrosta-1(10),2,4,6,8-pentaen-17β-ol.

By use of sodium chlorodifluoroacetate in the foregoing procedure, there is obtained 17α-(2',2'-difluorocyclopropyl) - 3 - methoxy - 5,10 - seco - 5,10 - methylene-19-norandrosta-1(10),2,4,6,8-pentaen-17β-ol.

The corresponding 17β-acyloxy derivatives, e.g. acetoxy, may be alternatively used in the foregoing procedure, the products thus-obtained being similarly esterified.

EXAMPLE 30

To a refluxing solution of 5 g. of 17α-ethynyl-3-methoxy - 5,10 - seco - 5,10 - methylene - 19-norandrosta-1(10),2,4,6,8 - pentaen-17β-ol in 50 ml. of anhydrous diglyme is added dropwise 8 molar equivalents of sodium chlorodifluoroacetate in 40 ml. of anhydrous diglyme with stirring. After completion of the addition, refluxing is continued for about 30 minutes. The reaction mixture is then cooled, filtered and the thus-obtained filtrate evaporated to dryness under reduced pressure. The thus-obtained residue is then chromatographed on Florisil absorbent (synthetic magnesium silicate) eluting with ether to yield 17α - (2',2'-difluorocyclopropenyl)-3-methoxy-5,10 - seco - 5,10 - methylene - 19 - norandrosta-1(10),2,4,6,8-pentaen-17β-ol.

EXAMPLE 31

A mixture of 2 g. of 5,10-methylene-19-norandrosta-1,7-diene-3,17-dione, about 2 equivalents of zinc powder and 100 ml. of dry tetrahydrofuran is stirred at 50°–60° for about two hours. Stirring is continued until starting material is exhausted and formation of the zinc enolate is complete as checked by thin layer chromatography. The mixture is then allowed to stand and cool and thereafter decanted. The thus-obtained solution is treated with an excess of tetrahydropyranyl chloride, stirred and allowed to stand at room temperature for several hours until the reaction is complete as checked by thin layer chromatography. The mixture is poured into dilute aqueous sodium carbonate solution and then extracted with methylene chloride. The methylene chloride extracts are washed, dried and evaporated to give 3 - (tetrahydropyran-2'-yloxy) - 5,10 - seco - 5,10 - methylene-19-norandrosta-1(10),2,4,7-tetraen-17-one which can be further purified by chromatography.

By using tetrahydrofuranyl chloride or bromide in the above procedure in place of tetrahydropyranyl chloride, there is obtained 3 - (tetrahydrofuran-2'-yloxy) - 5,10-seco - 5,10 - methylene - 19 - norandrosta - 1(10),2,4,7-tetraen-17-one.

By repeating the above procedure with the exception of using 5,10 - difluoromethylene - 19 - norandrosta-1,7-diene-3,17-dione or 5,10-dichloromethylene-19-norandrosta-1,7-diene-3,17-dione as the starting material, there is obtained 3 - (tetrahydropyran - 2' - yloxy) - 5,10 - seco-5,10 - difluoromethylene - 19 - norandrosta - 1(10),2,4,7-tetraen - 17 - one and 3 - (tetrahydropyran - 2' - yloxy)-5,10 - seco - 5,10 - dichloromethylene - 19 - norandrosta-1(10),2,4,7-tetraen-17-one.

EXAMPLE 32

To a solution of 1 g. of 3-(tetrahydropyran-2'-yloxy)-5,10 - seco - 5,10 - methylene - 19 - norandrosta - 1(10), 2,4,7-tetraen-17-one in 100 ml. of carbon tetrachloride, there is added about 1 equivalent of bromine in 50 ml. of carbon tetrcahloride. The reaction mixture is allowed to stand at room temperature for about 20 hours. The mixture is then washed, dried and evaporated to give 7,8 - dibromo - 3 - (tetrahydropyran-2'-yloxy)-5,10-seco-5,10 - methylene - 19 - norandrosta - 1(10),2,4 - trien-17-one which is dehydrobrominated using dry pyridine in tetrahydrofuran refluxing under nitrogen for about three hours to yield 3 - (tetrahydropyran-2'-yloxy) - 5,10-seco-5,10 - methylene - 19 - norandrosta - 1(10),2,4,6,8-pentaen-17-one.

By using the other 19 - norandrosta - 1(10),2,4,7-tetraenes of Example 31 in the above procedure, the corresponding 19-norandrosta-1(10),2,4,6,8 - pentaene derivatives are obtained.

Alternatively, the 5,10 - seco - 19 - norandrosta-1(10), 2,4,7-tetraenes of Example 31 can be treated with 2,3-dichloro-5,6-dicyano-1,4-benzoquinone using the procedure of Example 14 or with palladium catalyst to give the corresponding 5,10-seco-19-norandrosta - 1(10),2,4,6,8-pentaene derivatives.

EXAMPLE 33

A mixture of 1 g. of 3 - methoxy-5,10-seco-5,10-difluoromethylene-19-norandrosta - 1(10),2,4,6,8-pentaen-17β-ol, 1 g. of p-toluenesulfonic acid monohydrate, 50 ml. of acetic acid and 25 ml. of acetic anhydride is allowed to stand at room temperature for 24 hours and is then poured into water and stirred. This mixture is then extracted with methylene chloride and the extracts are dried and evaporated to yield 3-methoxy-5,10-seco-5,10-difluoromethylene - 19 - norandrosta - 1(10),2,4,6,8-pentaen-17β-ol 17-acetate.

EXAMPLE 34

To a solution of 5 g. of estra-5(10),7-diene-3,17β-diol in 100 ml. of diglyme heated to about 135°, there is added slowly a solution of 1.5 equivalents of sodium chlorodifluoroacetate in 100 ml. of diglyme over a period of about one hour. The reaction mixture is then allowed to cool to about room temperature and is then diluted with water and ethyl acetate. The ethyl acetate layer is separated, washed, dried over magnesium sulfate and evaporated to give 5,10-difluoromethylene-19-norandrost-7-ene-3,17β - diol which is treated with chromium trioxide is pyridine by the procedure of Example 12 to give 5,10-difluoromethylene-19-norandrost-7-ene-3,17-dione.

The above procedure is repeated with the exception of using 17α-methylestra-5(10),7-diene-3,17β-diol, 17α - cy- clopropyl-estra-5(10),7-diene-3,17β-diol and 17α-(2',2'-difluorocyclopropyl)-estra-5(10),7-diene-3,17β-diol as the starting material and there is obtained 17α-methyl-17β-hydroxy-5,10-difluoromethylene-19-norandrost - 7 - en - 3 - one, 17α - cyclopropyl - 17β-hydroxy-5,10-difluoromethylene-19-norandrost-7-en-3-one and 17α-(2',2'-difluorocyclopropyl)-17β-hydroxy-5,10-difluoromethylene - 19 - norandrost-7-en-3-one, respectively.

The above 5,10-difluoromethylene compounds are subjected to the procedure of Example 13 or 16 to furnish the 1,2-dehydro derivatives, i.e. 5,10-difluoromethylene-19-norandrosta-1,7-diene-3,17-dione, 17α-methyl-17β-hydroxy-5,10-difluoromethylene-19-norandrosta-1,7-dien - 3- one, 17α - cyclopropyl - 17β-hydroxy-5,10-difluoromethylene-19-norandrosta-1,7-dien-3-one and 17α-(2',2'-difluorocyclopropyl)-17β-hydroxy - 5,10 - difluoromethylene - 19-norandrosta-1,7-dien-3-one, respectively.

By repeating this example using sodium trichloroacetate in place of sodium chlorodifluoroacetate, the corresponding 5,10-dichloromethylene derivatives are obtained.

EXAMPLE 35

The procedure of Example 14 is repeated using 5,10-difluoromethylene-19-norandrosta-1,7-diene-3,17-dione as the starting material and there is obtained 3-acetoxy-5,10-seco-5,10-difluoromethylene-19-norandrosta - 1(10),2,4,6,8-pentaen-17-one.

Similarly, by using the other 5,10-dihalomethylene compounds of Example 34 in the process of Example 14, there is obtained 3-acetoxy-5,10-seco-5,10-difluoromethylene-17α-methyl-19 - norandrosta - 1(10),2,4,6,8 - pentaen-17β - ol, 3-acetoxy-5,10-seco-5,10-difluoromethylene-17α-cyclopropyl-19-norandrosta-1(10),2,4,6,8-pentaen-17β - ol, 3-acetoxy-5,10-seco-5,10-difluoromethylene - 17α - (2',2'-difluorocyclopropyl)-19-norandrosta - 1(10),2,4,6,8 - pentaen-17β-ol and the corresponding 5,10-seco-5,10-dichloromethylene compounds.

EXAMPLE 36

The procedure of Example 15 is repeated using as the starting material the 3-keto-5,10-dihalomethylene compounds obtained in Example 32 and there is afforded 3-methoxy-5,10-seco - 5,10 - difluoromethylene - 19 - norandrosta-1(10),2,4,6,8-pentaen-17-one, 3-methoxy-5,10-seco-5,10 - difluoromethylene - 17β - methyl - 19 - norandrosta-1(10),2,4,6,8-pentaen-17β-ol, 3 - methoxy-5,10-seco-3,10-difluoromethylene - 17α - cyclopropyl - 19 - norandrosta-1(10),2,4,6,8-pentaen-17β-ol, 3 - methoxy-5,10-seco-5,10-difluoromethylene - 17α-(2',2' - difluorocyclopropyl) - 19-norandrosta-1(10),2,4,6,8-pentaen-17β-ol, and the corresponding 5,10-seco-5,10-dichloromethylene compounds.

By using other alcohols such as ethanol, cyclopentanol, cyclohexanol, and the like, in place of methanol in the above procedure, the corresponding 3-ethoxy, 3-cyclopentyloxy and 3-cyclohexyloxy derivatives are obtained.

EXAMPLE 37

The procedure of Example 9 is repeated using 5,10-dichloromethylene-19-norandrost-7-ene - 3,17β - diol as the starting material and there is obtained 5,10-methylene-19-norandrost-7-ene-3,17β-diol which is oxidized using chromium trioxide in pyridine to the corresponding 3,17-dione which is then subjected to the processes of Examples 13 and 14 to yield 3-acetoxy-5,10-seco-5,10-methylene-19-norandrosta-1(10),2,4,6,8-pentaen-17-one.

EXAMPLE 38

To a refluxing solution of 1 g. of 3-methoxy-17α-(2',2'-dichlorocyclopropyl) - 17β - acetoxy-5,10-seco-5,10 - methylene-19-norandrosta-1(10),2,4,6,8-pentaene, 1.3 g. of magnesium shavings and 25 ml. of anhydrous ether is added over a one hour period 5.7 g. of ethyl bromide. When addition is complete, the reaction mixture is refluxed an additional hour and then cautiously hydrolyzed by dropwise addition of water followed by 10% hydrochloric acid. The ether layer is separated, dried and evaporated to give 3-methoxy-17α-propadienyl-17β-acetoxy-5,10 - seco - 5,10 - methylene - 19 - norandrosta - 1(10), 2,4,6,8-pentaen.

Alternatively, the 17α-propadienes can be prepared by treating a 17α-dichlorocyclopropyl compound with a molar excess of potassium t-butoxide in dimethylsulfoxide at room temperature for about 24 hours or by treatment with butyl lithium in ether at a temperature of from about −35° to room temperature.

The term "hydrolyzable carboxylic esters," as used herein, refers to those hydrolyzable carboxylic ester groups conventionally employed in the synthetic hormone art derived from hydrocarbon carboxylic acids. The term "hydrocarbon carboxylic acid" defines both substituted and unsubstituted hydrocarbon carboxylic acids. These acids can be completely saturated or possess varying degrees of unsaturation (including aromatic), can be of straight chain, branched chain, or cyclic structure, and preferably contain from 1 to 12 carbon atoms. In addition, they can be substituted by functional groups, for example, hydroxy, alkoxy containing up to six carbon atoms, acyloxy containing up to 12 carbon atoms, nitro, amino, halogeno, and the like, attached to the hydrocarbon backbone chain. Typical conventional hydrolyzable esters thus included within the scope of the term and the instant invention are acetate, propionate, butyrate, valerate, caproate, enanthate, caprylate, pelargonate, acrylate, undecenoate, phenoxyacetate, benzoate, phenylacetate, diphenylacetate, diethylacetate, trimethylacetate, t-butylacetate, trimethylhexanoate, methylneopentylacetate, cyclohexylacetate, cyclopentylpropionate, adamantoate, glycolate, methoxyacetate, hemisuccinate, hemiadipate, hemi-β,β-dimethylglutarate, acetoxyacetate, 2-chloro-4-nitrobenzoate, aminoacetate, diethylaminoacetate, piperidinoacetate, β-chloropropionate, trichloroacetate, β-chlorobutyrate, and the like.

What is claimed is:
1. A compound selected from those of the following formula:

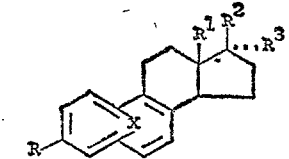

wherein

X is methylene, dichloromethylene, or difluoromethylene;
R is lower alkoxy having from one to about six carbon atoms;
$R^1$ is methyl or ethyl;
$R^2$ is hydroxy; and
$R^3$ is hydrogen, lower alkyl, lower alkenyl, lower alkynyl, lower haloalkynyl, cyclopropyl, dichlorocyclopropyl, difluorocyclopropyl, propadienyl, dichlorocyclopropenyl, or difluorocyclopropenyl.

2. A compound according to claim 1 wherein $R^3$ is hydrogen.
3. A compound according to claim 2 wherein R is methoxy.
4. A compound according to claim 1 wherein X is methylene.
5. The compound of claim 1 wherein R is methoxy.

References Cited
UNITED STATES PATENTS
3,185,681  5/1965  Knox _____ 260—586 H

OTHER REFERENCES
Woodward et al., J.A.C.S. vol. 74 (1952) 4223.

BERNARD HELFIN, Primary Examiner

U.S. Cl. X.R.
260—618 F, 586 R, 345.3, 346.2 M, 488 B, 469, 239.55 R, 397.3 397.4, 397.45, 397.5 999